United States Patent
Kim et al.

(10) Patent No.: US 11,524,617 B2
(45) Date of Patent: Dec. 13, 2022

(54) DEVICE FOR ADJUSTING A HEIGHT OF A MONO-POST TYPE HEADREST FOR A VEHICLE

(71) Applicants: HYUNDAI MOTOR COMPANY, Seoul (KR); KIA CORPORATION, Seoul (KR); WOOBO TECH CO., LTD., Pyeongtaek-si (KR); HYUNDAI TRANSYS INC., Seosan-si (KR)

(72) Inventors: Seung Hyun Kim, Daejeon (KR); Min Ju Lee, Hwaseong-si (KR); Byung Yong Choi, Hwaseong-si (KR); Sang Hyun Lee, Anyang-si (KR); Seon Chae Na, Yongin-si (KR); Hae Il Jeong, Incheon (KR); Jae Hyun Seo, Cheongju-si (KR); Ji Yun Seo, Hwaseong-si (KR); Jae Sung Lee, Seoul (KR); Hyun Sung Kim, Hwaseong-si (KR)

(73) Assignees: HYUNDAI MOTOR COMPANY, Seoul (KR); KIA CORPORATION, Seoul (KR); WOOBO TECH CO., LTD., Pyeongtaek-si (KR); HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 17/327,237

(22) Filed: May 21, 2021

(65) Prior Publication Data
US 2022/0111779 A1    Apr. 14, 2022

(30) Foreign Application Priority Data

Oct. 14, 2020  (KR) ........................ 10-2020-0132315

(51) Int. Cl.
*B60N 2/818* (2018.01)
*B60N 2/815* (2018.01)

(52) U.S. Cl.
CPC ............. *B60N 2/818* (2018.02); *B60N 2/815* (2018.02)

(58) Field of Classification Search
CPC ................................ B60N 2/818; B60N 2/815
See application file for complete search history.

(56) References Cited

U.S. PATENT DOCUMENTS

| | | | | |
|---|---|---|---|---|
| 3,027,194 A * | 3/1962 | Rumptz | ................ | B60N 2/818 297/410 |
| 3,511,535 A * | 5/1970 | Gunlock | ................ | B60N 2/818 248/161 |
| 3,563,603 A * | 2/1971 | D'Aprile | ................ | B60N 2/818 297/410 |
| 3,680,915 A * | 8/1972 | Freedman | ............. | B60N 2/818 297/410 |
| 4,478,456 A * | 10/1984 | Mitsui | .................... | B60N 2/818 248/407 |
| 5,882,071 A * | 3/1999 | Fohl | ....................... | B60N 2/888 297/216.12 |

(Continued)

*Primary Examiner* — David R Dunn
*Assistant Examiner* — Tania Abraham
(74) *Attorney, Agent, or Firm* — Lempia Summerfield Katz LLC

(57) ABSTRACT

A device for adjusting the height of a mono-post type headrest for a vehicle includes a headrest on a mono-post mounted on a seatback frame to be adjustable in height and includes a lever on one side of the headrest, thereby easily adjusting the headrest to the desired height by only a flipping operation for unlocking the lever.

13 Claims, 9 Drawing Sheets

(56) References Cited

U.S. PATENT DOCUMENTS

| | | | | |
|---|---|---|---|---|
| 6,273,509 B1* | 8/2001 | Reithmeier | .......... | B60N 2/2872 |
| | | | | 297/391 |
| 8,303,040 B2* | 11/2012 | Lai | .......... | A47C 7/38 |
| | | | | 297/410 |
| 9,415,707 B2* | 8/2016 | Böhm | .......... | B60N 2/815 |
| 10,562,425 B2* | 2/2020 | Jarrin | .......... | B60N 2/844 |
| 2002/0093231 A1* | 7/2002 | Estrada | .......... | B60N 2/829 |
| | | | | 297/216.12 |
| 2003/0151282 A1* | 8/2003 | Williams | .......... | B60N 2/815 |
| | | | | 297/410 |
| 2004/0217640 A1* | 11/2004 | Kreitler | .......... | B60N 2/818 |
| | | | | 297/404 |
| 2011/0148171 A1* | 6/2011 | Charles | .......... | B60N 2/815 |
| | | | | 297/410 |
| 2017/0113582 A1* | 4/2017 | Michalak | .......... | B60N 2/809 |

* cited by examiner

DEVICE FOR ADJUSTING A HEIGHT OF A MONO-POST TYPE HEADREST FOR A VEHICLE

CROSS-REFERENCE TO RELATED APPLICATION

This application claims under 35 U.S.C. § 119(a) the benefit of priority to Korean Patent Application No. 10-2020-0132315 filed on Oct. 14, 2020, the entire contents of which are incorporated herein by reference.

BACKGROUND

(a) Technical Field

The present disclosure relates to a device for adjusting the height of a mono-post type headrest for a vehicle, and more specifically, to a device for adjusting the height of a mono-post type headrest for a vehicle, which may easily adjust the height of a mono-post type headrest for a vehicle by only an operation of a lever.

(b) Background Art

As is well known, a seat for a vehicle is configured to include a seat cushion for seating the lower body of a passenger, a seatback for contacting the waist and back area of the passenger, and a headrest mounted on the upper portion of the seatback to be adjustable in height.

As illustrated in FIG. 1, a pair of stays 12 inserted into a seatback frame 20 to be adjustable in height are mounted on the bottom of the headrest 10. The upper end of the seatback has a pole guide device 30 mounted for the elevating guidance of the stay 12s.

Further, each stay 12 is formed with a plurality of locking grooves 14 and the respective pole guide device 30 is mounted with a push-pull type locking lever 32.

Therefore, by moving the stay 12s up to the desired height by pulling the locking levers 32, and then pushing the locking levers 32 to be fastened to or engage one of the plurality of locking grooves 14 in the stays 12, the height of the stays 12, and thus, the height of the headrest 10 may be adjusted to the desired height.

The design of such a headrest and a device for adjusting the height thereof are generally adopted but is not suitable for the design and concept of the seat for a future vehicle such as an autonomous vehicle. Thus, the design of the headrest of a new paradigm is required, and as an example, may be a mono-post type headrest.

The above information disclosed in this Background section is only to enhance understanding of the background of the disclosure. Accordingly, the Background section may contain information that does not form the prior art that is already known in this country to a person of ordinary skill in the art.

SUMMARY OF THE DISCLOSURE

There is a need for a height adjustment device of a new structure for the mono-post type headrest.

The present disclosure is devised in consideration of the above points. An object of the present disclosure is to provide a device for adjusting the height of a mono-post type headrest for a vehicle. The device may mount a headrest on a mono-post mounted on a seatback frame to be adjustable in height. The device may include a lever mounted on one side of the headrest, thereby easily adjusting the headrest to the desired height by only a flipping operation for the locking release of the lever.

To achieve the object, the present disclosure provides a device for adjusting the height of a mono-post type headrest for a vehicle. The device includes: a mono-post provided in a structure mounted on a seatback frame and in which a plurality of locking holes are vertically formed at a predetermined interval; a front cover fastened to the mono-post to move up and down; a lever flippably mounted at a location on one side of the front cover; a locking device connected to the lever and mounted on a back surface of the front cover, the locking device configured to be locked and fastened to any one locking hole of the plurality of locking holes of the mono-post, or unlocked by being released from the one locking hole of the mono-post in conjunction with a flipping operation of the lever; a middle cover covering the locking device and the mono-post and mounted on the back surface of the front cover; and a rear cover covering the middle cover and assembled to the back surface of the front cover.

The locking device according to an embodiment of the present disclosure is configured to include: a shaft contacting an inner portion of the lever and disposed on the back surface of the front cover to be laterally transportable; a lock plate provided in a flat structure in which a guide hole is formed to pass through, the lock plate connected to an inner end portion of the shaft and disposed on the back surface of the front cover to be laterally transportable; and a locking bracket provided in a structure having a locking end inserted into the one locking hole of the mono-post on the back surface thereof. The locking bracket is formed with a lock pin inserted into the guide hole of the lock plate on an upper surface thereof and rotatably fastened to the back surface of the front cover.

The locking device according to an embodiment of the present disclosure is configured to further include: a rotary shaft formed on a lower end of the locking bracket and connected to the back surface of the front cover; and a return spring mounted on the rotary shaft to provide an elastic restoring force upon rotation of the locking bracket.

In one embodiment, the lever is composed of a user operating lever configured to be flipped by a user and a flipping force delivery lever fastened to the user operating lever by a hinge pin to contact an outer surface of the shaft.

Therefore, in a state where the lever is not operated, the lock pin is located at an innermost location in a slope section of the guide hole and the locking end of the locking bracket is locked to and inserted into the one locking hole of the mono-post by an elastic restoring force of a return spring.

On the other hand, when the lever is flipped and thus the lock plate is pushed inward while the shaft is pushed inward by the lever, the lock pin moves along a curved surface of the guide hole to be located at an outermost location in slope section of the guide hole and the locking bracket is rotated around the rotary shaft, such that the locking end is unlocked by being released from the one locking hole of the mono-post.

The locking device according to another embodiment of the present disclosure is configured to include: a cable connected to an inner portion of the lever; a lock plate provided in a flat structure having a guide hole with an inclined slope formed therethrough, the lock plate connected to an inner end of the cable and disposed on the back surface of the front cover to be laterally transportable; and a locking bracket provided in a structure having a locking end inserted into the one locking hole of the mono-post on the back surface thereof and formed with a lock pin inserted into the guide hole of the lock plate on the upper surface thereof, and rotatably fastened to the back surface of the front cover.

The locking device according to another embodiment of the present disclosure is configured to further include: a rotary shaft formed on a lower end of the locking bracket and connected to the back surface of the front cover; and a return spring mounted on the rotary shaft to provide an elastic restoring force upon rotation of the locking bracket.

Therefore, in a state where the lever is not operated, the lock pin is located at an innermost location in a slope section of the guide hole, and the locking end of the locking bracket is locked to and inserted into the one locking hole of the mono-post by an elastic restoring force of a return spring.

On the other hand, when the lever is pulled and thus a cable connected to the lever is pulled and the lock plate is pulled outward, the lock pin is moved to an outermost location in a slope section of the guide hole and the locking bracket is rotated around the rotary shaft, such that the locking end is unlocked by being released from the one locking hole of the mono-post.

In one embodiment, the back surface of the front cover is mounted with a plurality of guiding rollers contacting both side surfaces of the mono-post so as to be rollable.

In one embodiment, the back surface of the rear cover is attached with a back cover for a garnish function.

In one embodiment, the front surface of the front cover is attached with a pad covered by the cover.

Through the above configuration, the present disclosure provides the following effects.

First, it is possible to provide a mono-post type headrest in which the headrest is mounted on the mono-post mounted on the seatback frame to be adjustable in height.

Second, it is possible to mount the lever on one side of the headrest to easily adjust and move the headrest up and down to the desired height along the mono-post by only the flipping operation for unlocking the lever.

It should be understood that the terms "automotive" or "vehicular" or other similar terms as used herein are inclusive of motor vehicles in general such as: passenger automobiles including sports utility vehicles (operation SUV), buses, trucks, and various commercial vehicles; watercraft including a variety of boats and ships; aircraft; and the like, and such as hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example vehicles that are both gasoline-powered and electric-powered.

The above and other features of the disclosure are discussed below.

BRIEF DESCRIPTION OF THE DRAWINGS

The above and other features of the present disclosure will now be described in detail with reference to certain examples thereof illustrated in the accompanying drawings which are given herein below by way of illustration only, and thus are not imitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined by the particular intended application and use environment.

In the figures, reference numbers refer to the same or equivalent sections or elements of the present disclosure throughout the drawings.

DETAILED DESCRIPTION

Hereinafter, specific embodiments of the present disclosure are described in detail with reference to the accompanying drawings.

Figure 1:
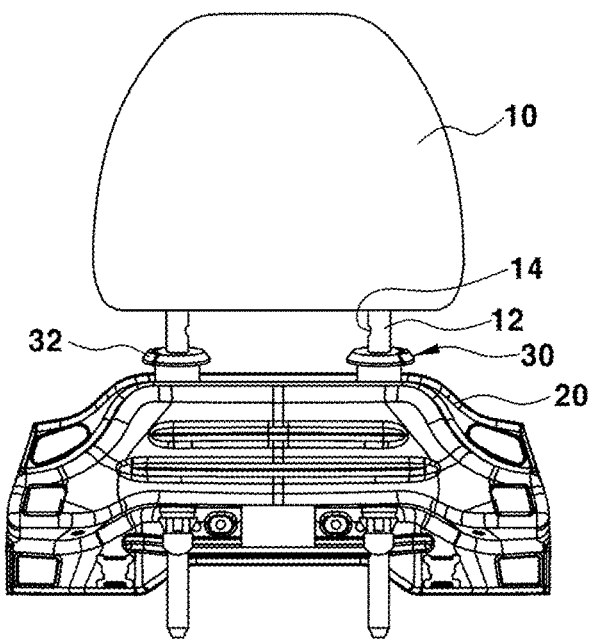
FIG. 1 is a schematic diagram illustrating a conventional device for adjusting the height of a headrest.
Figure 2:
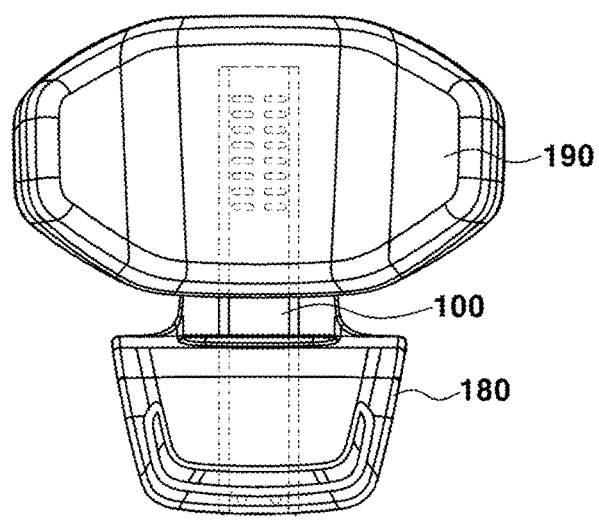
FIGS. 2 and 3 are perspective diagrams illustrating the appearance of a mono-post type headrest for a vehicle according to the present disclosure.
Figure 3:
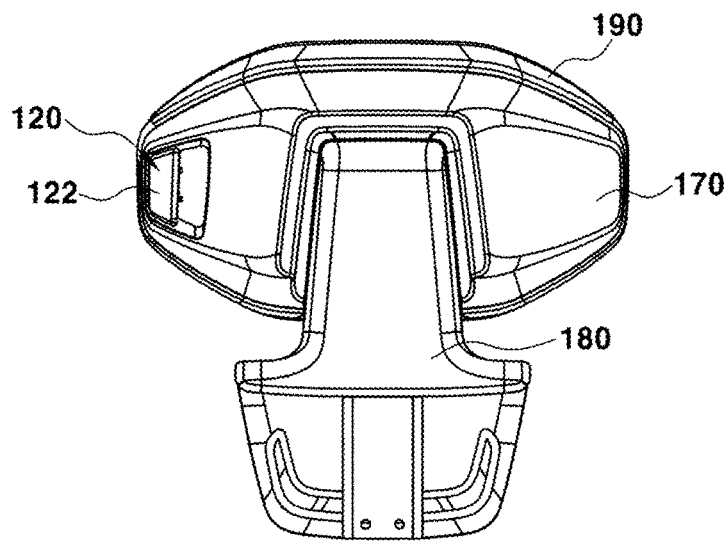
Figure 4:
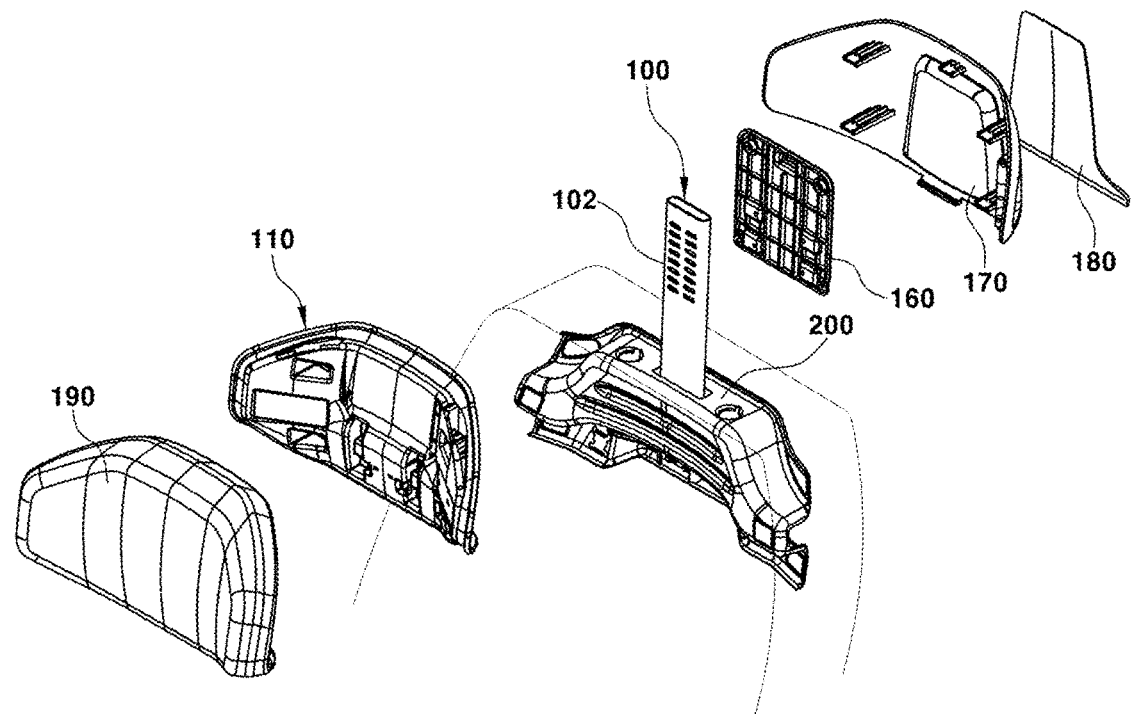
FIG. 4 is an exploded perspective diagram illustrating the mono-post type headrest for the vehicle and a device for adjusting the height thereof according to the present disclosure.
Figure 5A:
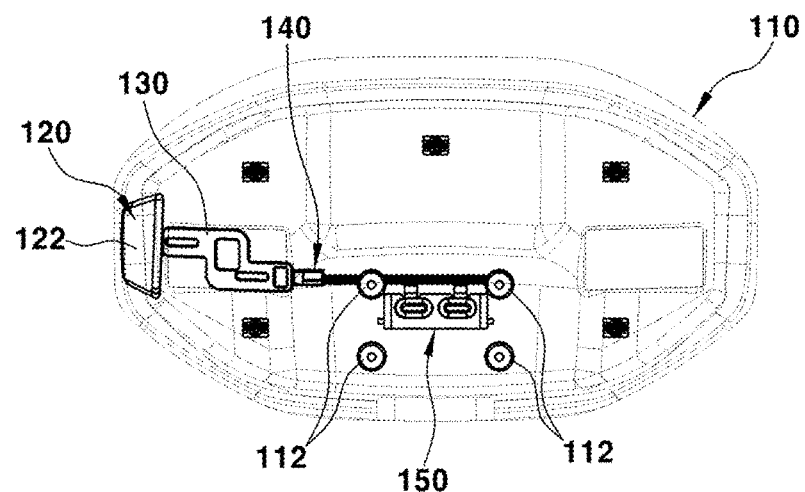
FIGS. 5A and 5B are rear view diagrams illustrating the device for adjusting the height of the mono-post type headrest for the vehicle according to the present disclosure.
Figure 5B:
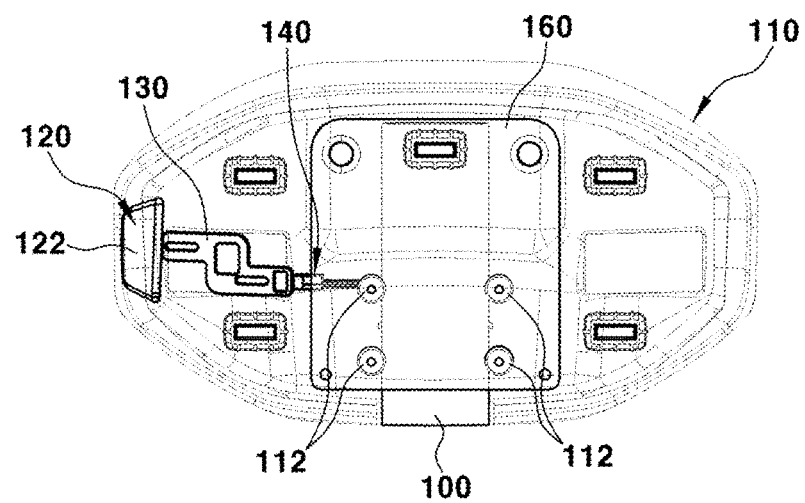

FIGS. 2-4 illustrate a mono-post type headrest for a vehicle and a device for adjusting the height thereof according to the present disclosure. FIGS. 5A and 5B are rear view diagrams illustrating a front cover among the components of the device for adjusting the height of the mono-post type headrest according to the present disclosure viewed from the back.

As illustrated in FIGS. 2-4, a mono-post 100 is mounted on a seatback frame 200.

The front surface of the mono-post 100 is formed with a plurality of locking holes 102 at a predetermined interval vertically in the longitudinal direction. In this embodiment, the mono-post 100 has to adjacent vertical columns of the locking holes.

Referring to FIG. 5B, a front cover 110 and a middle cover 160 are assembled to each other with the mono-post 100 interposed therebetween.

In other words, in a state where the front cover 110 is fastened to the mono-post 100 to move up and down, the middle cover 160 covers the mono-post 100 and is assembled to the front cover 110 via a screw or the like.

To guide the up and down movement of the front cover 110, as illustrated in FIG. 5A, the back surface of the front cover 110 has two pairs of guiding rollers 112. The guiding rollers 112 contact both side surfaces of the mono-post 100 to be rollable, i.e., to be capable of rolling along both side surfaces.

Therefore, when the front cover 110 moves up and down, the guiding rollers 112 perform the rolling motion along both side surfaces of the mono-post 100, such that the front cover may easily move up and down.

A lever 120 is mounted on one side location of the back surface of a rear cover 70, which is located on the back of the front cover 110. The lever 120 can be flipped between two positions, i.e., is flippably mounted on the one side of the rear cover 70.

Figure 8:
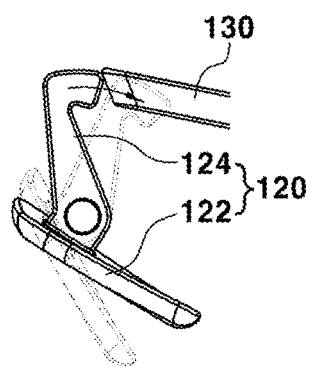
FIG. 8 is a plan view diagram illustrating a flipping state of a lever among the components of the device for adjusting the height of the mono-post type headrest for the vehicle according to the present disclosure.

In one embodiment, as illustrated in FIG. 8, the lever 120 has a user operating lever 122 configured to be flipped by the user. The lever 120 also has a flipping force delivery lever 124 that is fastened to the user operating lever 122 by a hinge pin and that contacts the outer surface of a shaft 130 among the components of a locking device.

Therefore, when the user flips the user operating lever 122, the flipping force delivery lever 124 pushes the shaft 130 while rotating in the same direction.

More particularly, the locking device including the shaft 130, which interlocks with the lever 120, is mounted on the back surface of the front cover 110.

The locking device may be configured as an operating mechanism mounted on the back surface of the front cover 110. The locking device is configured to be locked and fastened to one locking hole of the plurality of locking holes 102 of the mono-post 100 or unlocked by being released from the one locking hole 102 of the mono-post 100 in conjunction with the flipping operation of the lever 120. In this example, the locking device is configured to be locked and fastened to two laterally adjacent locking holes 102, one in each of the two adjacent columns on the mono-post 100.

A configuration of the locking device according to an embodiment of the present disclosure is described as follows.

First, the shaft 130 contacting the flipping force delivery lever 124 of the lever 120 is disposed on the back surface of the front cover 110 so as to be laterally transportable.

Further, a lock plate 140 connected to the inner end of the shaft 130 is disposed on the back surface of the front cover 110 so as to be laterally transportable.

Figure 6:
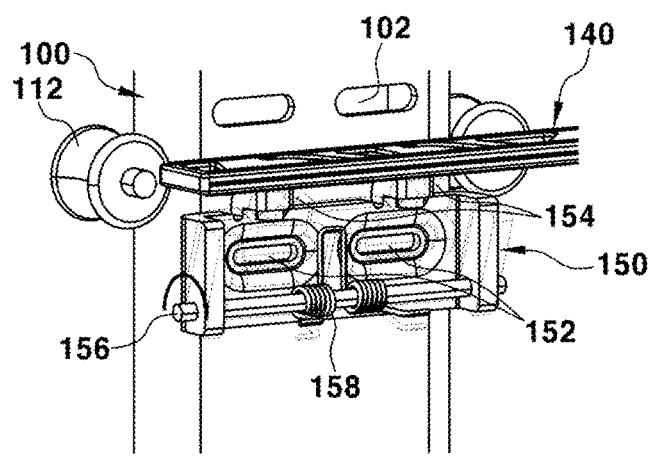
FIG. 6 is a perspective front view diagram illustrating a lock plate and a locking bracket among the components of the device for adjusting the height of the mono-post type headrest for the vehicle according to the present disclosure.

As illustrated in FIG. 6, the lock plate 140 may be provided in a flat structure in which two or more curved guide holes 142 are formed to pass through the lock plate. The pass-through shape of the guide holes 142 may vary as long as it is sloped, i.e., an inclined shape regardless of being a straight line or a curve.

Further, a locking bracket 150 performing the rotating motion upon the linear motion of the lock plate 140 is rotatably fastened to the back surface of the front cover 110.

Figure 7:
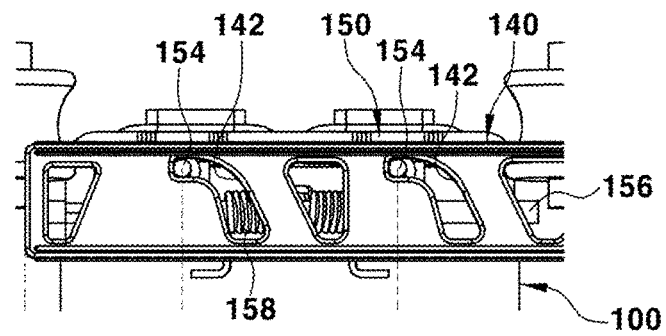
FIG. 7 is a perspective top view diagram illustrating a state before operation of the lock plate and the locking bracket among the components of the device for adjusting the height of the mono-post type headrest for the vehicle according to the present disclosure.

As illustrated in FIG. 7, the locking bracket 150 is provided in a structure with a locking end 152 inserted into one of the locking holes 102 of each column of the mono-post 100 on the back surface thereof. The locking bracket 150 is formed with a lock pin 154 inserted into each of the guide holes 142 of the lock plate 140 on the upper surface thereof.

Further, the lower end of the locking bracket 150 is formed with a rotary shaft 156 connected to the back surface of the front cover 110. A return spring 158 provides an elastic restoring force upon rotation of the locking bracket 150 and is inserted into and fastened to the rotary shaft 156.

As illustrated in FIG. 5B, the back surface of the front cover 110 is fastened to the middle cover 160 covering the lock plate 140 and the locking bracket 150 among the components of the locking device to prevent separation of the lock plate 140 and the locking bracket 150.

Further, the back surface of the front cover 110 is fastened to a rear cover 170 covering the shaft 130 and the middle cover 160. Thus, as illustrated in FIG. 3, the lever 120 is flippably located at a location on one side of the back surface of the rear cover 170.

Further, the front surface of the front cover 110 is attached with a pad 190 covered by the cover substantially contacting the passenger's head, as illustrated in FIG. 2.

In one embodiment, the back surface of the rear cover 170 is further attached with a back cover 180 for a garnish function.

A process of adjusting the height of the headrest performed by the locking device according to the embodiment is described as follows.

Figure 10:
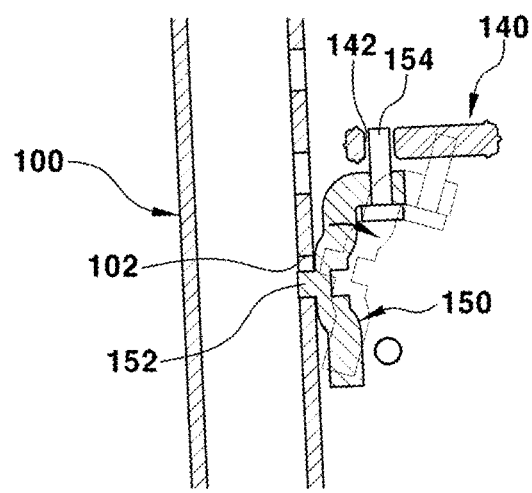
FIG. 10 is a cross-sectional diagram illustrating the state before and after operation of the lock plate and the locking bracket among the components of the device for adjusting the height of the mono-post type headrest for the vehicle according to the present disclosure.

As illustrated in FIGS. 7 and 10, in the state where the lever is not operated (i.e., a state where the lever is not flipped), each lock pin 154 of the locking bracket 150 is located at the innermost location in the corresponding section of the respective guide hole 142 of the lock plate 140. Each locking end 152 of the locking bracket 150 is maintained in the state of being locked to and inserted into the selected locking hole 102 of the mono-post 100 by the elastic restoring force of the return spring 158.

Therefore, the headrest including the front cover 110, the middle cover 160, and the like is maintained in the fixed state.

On the other hand, when the user flips the user operating lever 122 of the lever 120 to adjust the height of the headrest, as illustrated in FIG. 8, the flipping force delivery lever 124, which is fastened to the user operating lever 122 by the hinge pin, rotates to push the shaft 130 inward.

Subsequently, the shaft 130 is pushed inward to push the lock plate 140.

Figure 9:
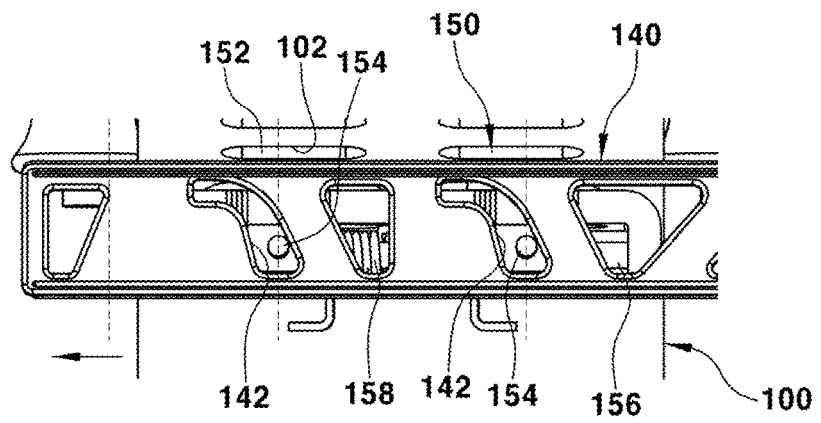
FIG. 9 is a perspective top view diagram illustrating a state after operation of the lock plate and the locking bracket among the components of the device for adjusting the height of the mono-post type headrest for the vehicle according to the present disclosure.

At the same time, as illustrated in FIG. 9, each lock pin 154 of the locking bracket 150 moves along the corresponding curved or sloped surface of the respective guide hole 142 of the lock plate 140 to be located at the outermost location in the section of the guide hole 142. The locking bracket 150 is rotated around the rotary shaft 156, such that, as illustrated in FIG. 10, each locking end 152 of the locking bracket 150 is unlocked by being released from the respective locking hole 102 of the mono-post 100.

Therefore, the user may adjust the height of the headrest to the desired height while moving the headrest upward or downward.

When the height of the headrest is adjusted to the desired height and then the lever 120 is released, each locking end 152 of the locking bracket 150 is locked to and inserted into the selected locking hole 102 of the mono-post 100 again by the elastic restoring force of the return spring 158, such that the headrest is then in a state of being fixed at the desired height.

A configuration of the locking device according to another embodiment of the present disclosure is described with reference to FIGS. 11-16 as follows.

A locking device according to another embodiment of the present disclosure is characterized in that the lever 120 and the lock plate 140 are connected by a cable 132. The guide holes 146 have an inclined slope 144 formed on the lock plate 140 and the lock pins 154 of the locking bracket 150 are moved along the inclined slopes 144.

Figure 11:
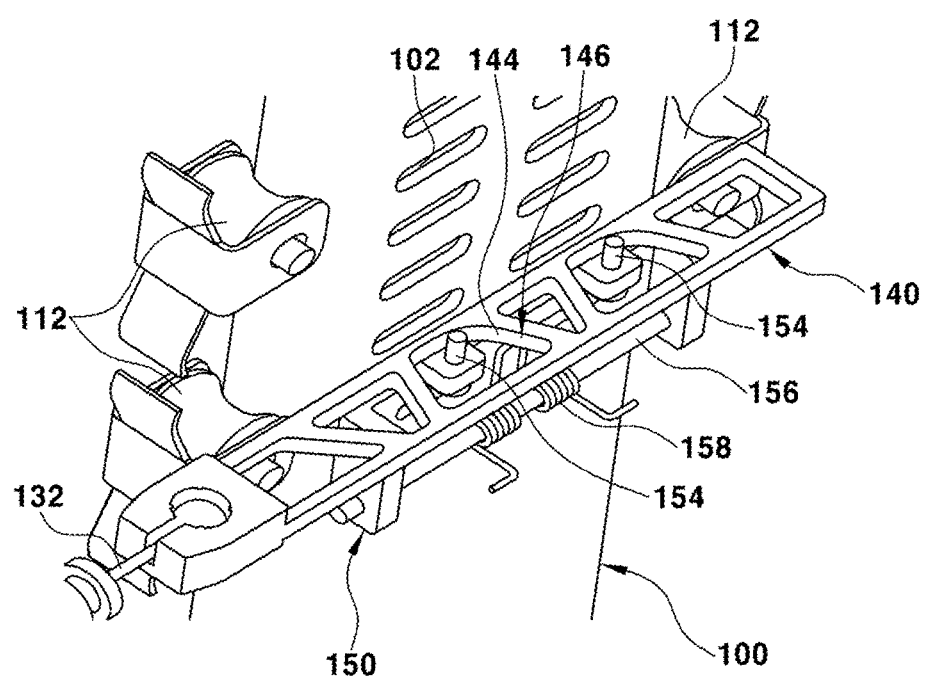
FIG. 11 is a perspective diagram illustrating a state before operation of another embodiment of a device for adjusting the height of the mono-post type headrest for the vehicle according to the present disclosure.
Figure 12:
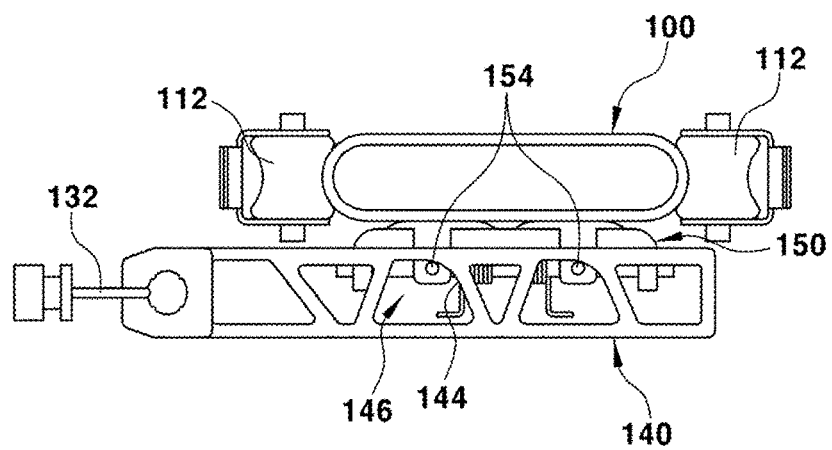
FIG. 12 is a plan diagram illustrating the state before the operation of another embodiment of the device for adjusting the height of the mono-post type headrest for the vehicle according to the present disclosure.

The lock plate 140 is disposed on the back surface of the front cover 110 so as to be laterally transportable. As illustrated in FIGS. 11 and 12, the lock plate 140 has one end connected to the inner end of the cable 132 extending from the lever 120. The lock plate 140 is provided in a flat structure in which the guide holes 146 with the inclined slopes 144 are formed through the lock plate 140.

As described in the embodiment, the locking bracket 150 is provided in a structure with the locking end 152 inserted into the selected locking hole 102 of the mono-post 100 on the back surface thereof and with the lock pin 154s inserted into the guide holes 146 of the lock plate 140 on the upper surface thereof, thereby being rotatably fastened to the back surface of the front cover 110.

Further, as described in the embodiment, the lower end of the locking bracket 150 is formed with the rotary shaft 156 connected to the back surface of the front cover 110. The return spring 158 is configured to provide the elastic restoring force and is inserted into and fastened to the rotary shaft 156 upon rotation of the locking bracket 150.

A process of adjusting the height of the headrest performed by the locking device according to this embodiment is described as follows.

Figure 13:
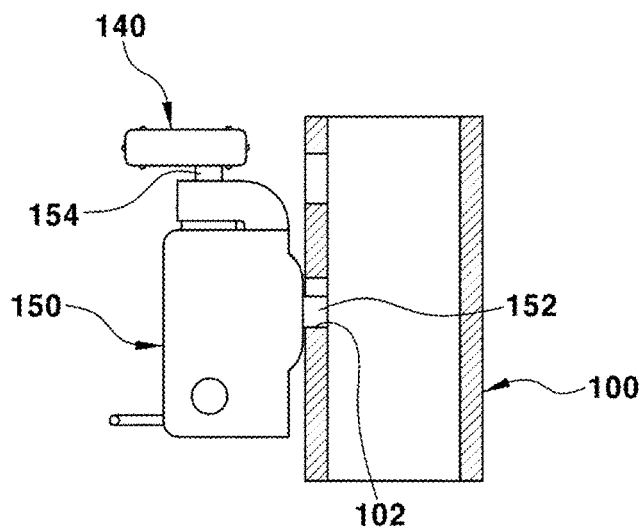
FIG. 13 is a cross-sectional diagram illustrating the state before the operation of another embodiment of the device for adjusting the height of the mono-post type headrest for the vehicle according to the present disclosure.

First, in the state where the lever is not operated (i.e., a state where the lever is not flipped), as illustrated in FIGS. 11-13, each the lock pin 154 of the locking bracket 150 is located at the innermost location in the section of the corresponding inclined slope 144 formed in the respective guide hole 146 of the lock plate 140. The locking end 152 of the locking bracket 150 is maintained in the state of being locked to and inserted into the locking hole 102 of the mono-post 100 by the elastic restoring force of the return spring 158.

Therefore, the headrest including the front cover 110, the middle cover 160, and the like is maintained in the fixed state.

Figure 14:
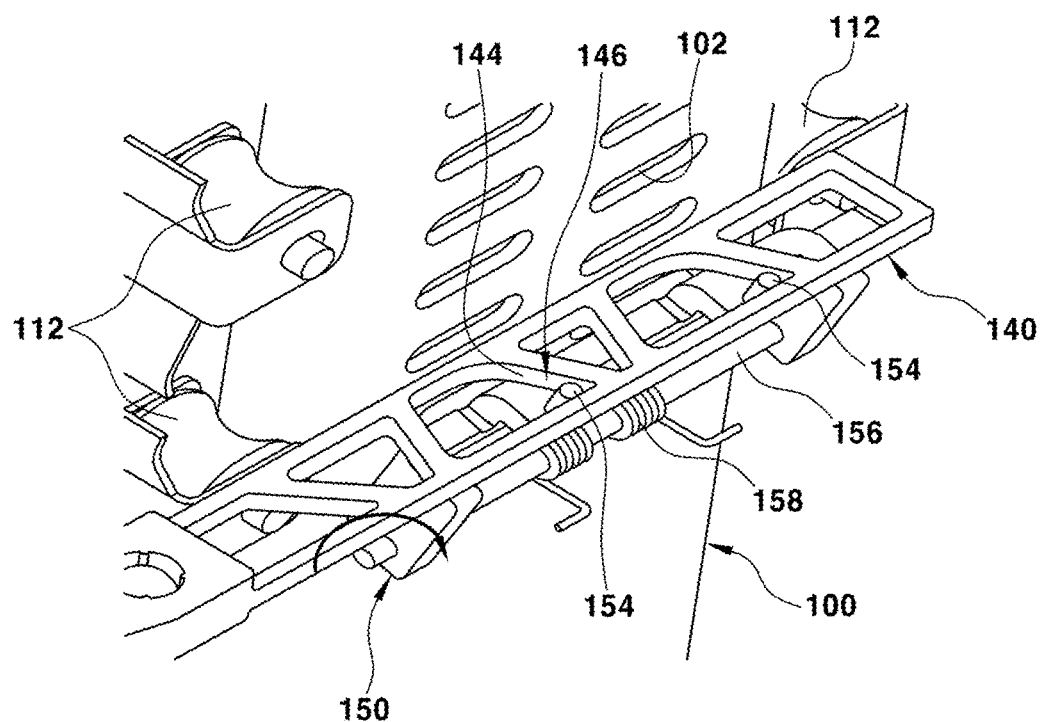
FIG. 14 is a perspective diagram illustrating a state after the operation of another embodiment of the device for adjusting the height of the mono-post type headrest for the vehicle according to the present disclosure.
Figure 15:
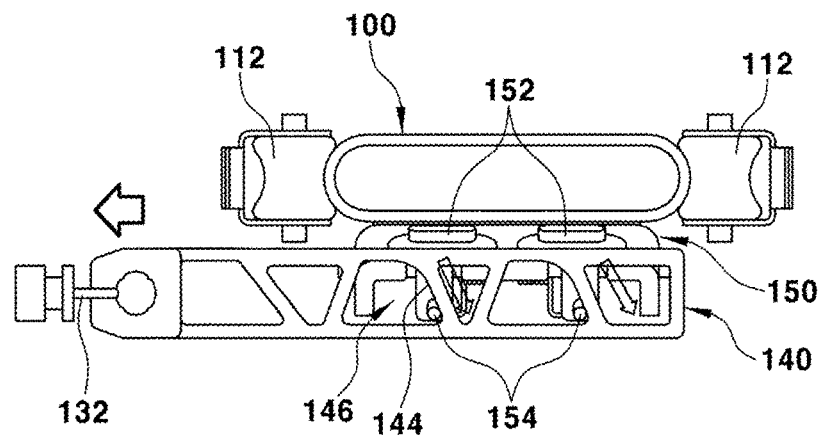
FIG. 15 is a plan view diagram illustrating the state after the operation of another embodiment of the device for adjusting the height of the mono-post type headrest for the vehicle according to the present disclosure.

On the other hand, when the user flips the lever 120 to adjust the height of the headrest, as illustrated in FIGS. 14 and 15, the cable 132 connected to the lever 120 is pulled, and subsequently, the cable 132 is pulled to pull the lock plate 140.

Figure 16:
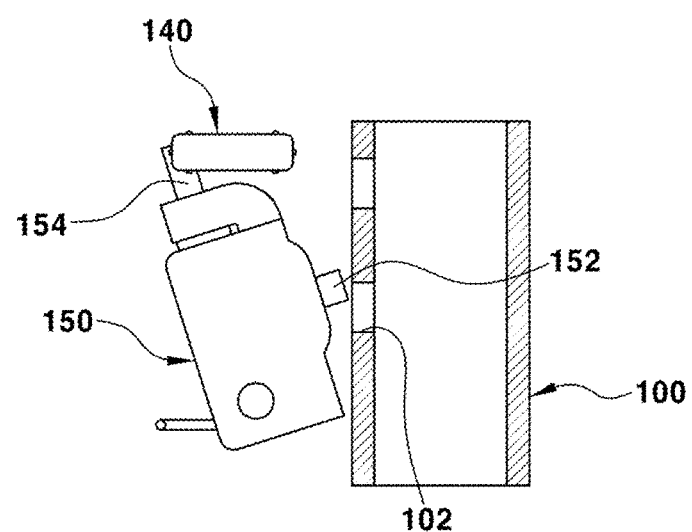
FIG. 16 is a cross-sectional diagram illustrating the state after the operation of another embodiment of the device for adjusting the height of the mono-post type headrest for the vehicle according to the present disclosure.

At the same time, as illustrated in FIGS. 14 and 15, each lock pin 154 of the locking bracket 150 moves along the corresponding inclined slope 144 of the respective guide hole 146 of the lock plate 140 to be located at the outermost location in the section of the guide hole 146. The locking bracket 150 is rotated around the rotary shaft 156, such that, as illustrated in FIG. 16, the locking end 152 of the locking bracket 150 is unlocked by being released from the selected locking holes 102 of the mono-post 100.

Therefore, the user may adjust the height of the headrest to the desired height while moving the headrest upward or downward.

When the height of the headrest is adjusted to the desired height and then the lever 120 is released, the locking end 152 of the locking bracket 150 is locked to and inserted into the locking hole 102 of the mono-post 100 again by the elastic restoring force of the return spring 158, such that the headrest is in the state of being fixed at the desired height.

The above embodiment may include only a single column of the plurality of locking holes 102, one locking end 152, one guide hole, and one lock pin 154. As described above, it is possible to provide a mono-post type headrest in which the headrest is mounted on the mono-post 100, which is mounted on the seatback frame 200 to be adjustable in height, and more particularly, to easily adjust the up and down movement of the headrest along the mono-post to the desired height by only the flipping operation for unlocking the lever 120, which is mounted on one side of the headrest.

What is claimed is:
1. A device for adjusting the height of a mono-post type headrest for a vehicle, the device comprising:
    a mono-post provided in a structure in which a plurality of locking holes is vertically formed at a predetermined interval, the mono-post mounted on a seatback frame;
    a front cover fastened to the mono-post to be movable up and down;
    a lever flippably mounted at a location on one side of the front cover;
    a locking device connected to the lever and mounted on the back surface of the front cover, the locking device configured to be locked and fastened to any one locking hole of the plurality of locking holes of the mono-post or unlocked by being released from the one locking hole of the mono-post in conjunction with a flipping operation of the lever;
    a middle cover covering the locking device and the mono-post and mounted on the back surface of the front cover; and
    a rear cover covering the middle cover and assembled to the back surface of the front cover,
    wherein the locking device includes
        a shaft contacting an inner portion of the lever and disposed on the back surface of the front cover to be laterally transportable,
        a lock plate provided in a flat structure having a guide hole formed therethrough, the lock plate connected to an inner end of the shaft and disposed on the back surface of the front cover to be laterally transportable, and
        a locking bracket provided in a structure having a locking end inserted into the one locking hole of the mono-post on the back surface thereof, the locking bracket formed with a lock pin inserted into the guide hole of the lock plate on an upper surface thereof, and the locking bracket rotatably fastened to the back surface of the front cover.

2. The device of claim 1,
wherein the locking device further comprises:
a rotary shaft formed on a lower end of the locking bracket and connected to the back surface of the front cover; and
a return spring mounted on the rotary shaft to provide an elastic restoring force upon rotation of the locking bracket.

3. The device of claim 1,
wherein the lever is composed of a user operating lever configured to be flipped by a user and a flipping force delivery lever fastened to the user operating lever by a hinge pin to contact an outer surface of the shaft.

4. The device of claim 1,
wherein, in a state where the lever is not operated, the lock pin is located at an innermost location in a sloped section of the guide hole, and the locking end of the locking bracket is locked to and inserted into the one locking hole of the mono-post by an elastic restoring force of a return spring.

5. The device of claim 1,
wherein, when the lever is flipped and thus the lock plate is pushed inward while the shaft is pushed inward by the lever, the lock pin moves along a curved surface of the guide hole to be located at an outermost location in a sloped section of the guide hole and the locking bracket is rotated around the rotary shaft, such that the locking end is unlocked by being released from the one locking hole of the mono-post.

6. The device of claim 1, wherein the back surface of the front cover is mounted with a plurality of guiding rollers contacting both side surfaces of the mono-post so as to be rollable.

7. The device of claim 1, wherein the back surface of the rear cover is further attached with a back cover for a garnish function.

8. The device of claim 1, wherein the front surface of the front cover is attached with a pad covered by the cover.

9. A device for adjusting the height of a mono-post type headrest for a vehicle, the device comprising:
a mono-post provided in a structure in which a plurality of locking holes is vertically formed at a predetermined interval, the mono-post mounted on a seatback frame;
a front cover fastened to the mono-post to be movable up and down;
a lever flippably mounted at a location on one side of the front cover;
a locking device connected to the lever and mounted on the back surface of the front cover, the locking device configured to be locked and fastened to any one locking hole of the plurality of locking holes of the mono-post or unlocked by being released from the one locking hole of the mono-post in conjunction with a flipping operation of the lever;
a middle cover covering the locking device and the mono-post and mounted on the back surface of the front cover; and
a rear cover covering the middle cover and assembled to the back surface of the front cover,
wherein the locking device includes
a cable connected to the inner portion of the lever,
a lock plate provided in a flat structure having a guide hole with an inclined slope formed therethrough, the lock plate connected to an inner end of the cable and disposed on the back surface of the front cover to be laterally transportable, and
a locking bracket provided in a structure having a locking end inserted into the one locking hole of the mono-post on the back surface thereof, the locking bracket formed with a lock pin inserted into the guide hole of the lock plate on an upper surface thereof, and the locking bracket rotatably fastened to the back surface of the front cover.

10. The device of claim 9, wherein the locking device further comprises:
a rotary shaft formed on a lower end of the locking bracket and connected to the back surface of the front cover; and
a return spring mounted on the rotary shaft to provide an elastic restoring force upon rotation of the locking bracket.

11. The device of claim 9, wherein, in a state where the lever is not operated, the lock pin is located at an innermost location in a slope section of the guide hole, and the locking end of the locking bracket is locked to and inserted into the one locking hole of the mono-post by an elastic restoring force of a return spring.

12. The device of claim 9, wherein, when the lever is pulled and thus a cable connected to the lever is pulled and the lock plate is pulled outward, the lock pin is moved to an outermost location in a slope section of the guide hole and the locking bracket is rotated around the rotary shaft, such that the locking end is unlocked by being released from the one locking hole of the mono-post.

13. A device for adjusting the height of a mono-post type headrest for a vehicle, the device comprising:
a mono-post provided in a structure in which a plurality of locking holes is vertically formed at a predetermined interval, the mono-post mounted on a seatback frame;
a front cover fastened to the mono-post to be movable up and down;
a lever flippably mounted at a location on one side of the front cover;
a locking device connected to the lever and mounted on the back surface of the front cover, the locking device configured to be locked and fastened to any one locking hole of the plurality of locking holes of the mono-post or unlocked by being released from the one locking hole of the mono-post in conjunction with a flipping operation of the lever;
a middle cover covering the locking device and the mono-post and mounted on the back surface of the front cover; and
a rear cover covering the middle cover and assembled to the back surface of the front cover,
wherein the back surface of the front cover is mounted with a plurality of guiding rollers contacting both side surfaces of the mono-post so as to be rollable.

* * * * *